United States Patent
Kim et al.

(10) Patent No.: US 7,451,257 B2
(45) Date of Patent: **\*Nov. 11, 2008**

(54) UNIVERSAL SERIAL BUS DEVICE HAVING LOGICAL CIRCUIT FOR CONVERSIVE AND IMMEDIATE HOST RESET OPERATION

(75) Inventors: Won-tac Kim, Seoul (KR); Woo-sun Hwang, Yongin (KR)

(73) Assignee: Samsung Electronics Co., Ltd. (KR)

( * ) Notice: Subject to any disclaimer, the term of this patent is extended or adjusted under 35 U.S.C. 154(b) by 0 days.

This patent is subject to a terminal disclaimer.

(21) Appl. No.: 11/607,636

(22) Filed: Dec. 1, 2006

(65) Prior Publication Data

US 2007/0079033 A1    Apr. 5, 2007

Related U.S. Application Data

(63) Continuation of application No. 10/269,264, filed on Oct. 11, 2002, now Pat. No. 7,162,555.

(30) Foreign Application Priority Data

Oct. 12, 2001    (KR)    .................... 01-63052

(51) Int. Cl.
  *G06F 13/42*    (2006.01)
  *G06F 13/38*    (2006.01)
  *G06F 13/10*    (2006.01)
  *G06F 13/20*    (2006.01)
(52) U.S. Cl. ............................ 710/105; 710/36; 710/38
(58) Field of Classification Search ................. None
  See application file for complete search history.

(56) References Cited

U.S. PATENT DOCUMENTS 5,383,230 A    1/1995    Fuse et al.

(Continued)

FOREIGN PATENT DOCUMENTS

EP    1139226 A1 *    10/2001

(Continued)

OTHER PUBLICATIONS

Hill et al.; "Computer Aided Logical Design with Emphasis on VLSI"; John Wiley & Sons Inc.; 1993; Fourth Edition; pp. 205-206.

(Continued)

*Primary Examiner*—Paul R. Myers
*Assistant Examiner*—Ryan M Stiglic
(74) *Attorney, Agent, or Firm*—Mills & Onello, LLP

(57) ABSTRACT

A Universal Serial Bus (USB) device for exchanging data with a USB host connected via a USB cable is provided. In a USB device for exchanging data with a USB host connected via a USB cable, the USB device comprises a USB encoder for outputting USB encoding data; a reset controller for generating a reset control signal that is activated in a predetermined logic level when the USB device needs to be reset; and a data output unit for selecting and outputting one of the USB encoding data and the logic low signal, in response to the reset control signal. According to the USB device of the present invention, the user need not physically disconnect the USB cable. Instead, the user manually selects the reset of the USB device from the programs of the PC that includes the USB host. In addition, the automatic program saved in the system equipped with the USB device helps to implement the reset operation of the USB device automatically when a predetermined situation occurs.

16 Claims, 5 Drawing Sheets

U.S. PATENT DOCUMENTS

| | | |
|---|---|---|
| 6,101,076 A | 8/2000 | Tsai et al. |
| 6,260,162 B1 | 7/2001 | Typaldos et al. |
| 6,415,342 B1 * | 7/2002 | Wahl et al. .................. 710/100 |
| 6,567,921 B1 | 5/2003 | Guziak |
| 6,647,452 B1 * | 11/2003 | Sonoda ....................... 710/305 |
| 6,744,810 B1 | 6/2004 | Iyer et al. |
| 6,791,950 B2 | 9/2004 | Wu |
| 6,813,672 B1 | 11/2004 | Kamran et al. |
| 7,162,555 B2 * | 1/2007 | Kim et al. ................... 710/105 |
| 2005/0066087 A1 * | 3/2005 | Wu .............................. 710/63 |

FOREIGN PATENT DOCUMENTS

| | | |
|---|---|---|
| KR | 10-2001-0019356 | 3/2001 |
| KR | 10-2001-0019478 | 3/2001 |

OTHER PUBLICATIONS

Hennessy et al.; "Computer Organization and Design"; Morgan Kaufmann Publishers Inc; Second Edition; 1998; p. B-9.

Compaq et al.; "Universal Serial Bus Specification"; Apr. 27, 2000; Revision 2.0; pp. 13, 21, 120, 125, 146, 153, 154.

* cited by examiner

FIG. 6

DISR1 | 7 | 6 . . . 0

[7] : STARTING TIMER
[6:0] : BIT[22:16] OF WDT_CNT[22:0]

DISR2 | 7 . . . 0

[7:0] : BIT[15:8] OF WDT_CNT[22:0]

DISR3 | 7 . . . 0

[7:0] : BIT[7:0] OF WDT_CNT[22:0]

SET EXAMPLES OF WDT_CNT[22:0]

| WDT_CNT[22:0] | | | | | | N $(2^{TOV+7})$ | SEO PERIOD (N×20.833ns) |
|---|---|---|---|---|---|---|---|
| 22 | 21 | ... | 2 | 1 | 0 | | |
| X | X | X | X | X | 1 | $2^{07}$ | 02.67μs |
| X | X | X | X | 1 | 0 | $2^{08}$ | 05.33μs |
| X | X | X | 1 | 0 | 0 | $2^{09}$ | 10.67μs |
| X | 1 | 0 | 0 | 0 | 0 | $2^{28}$ | 05.59s |
| 1 | 0 | 0 | 0 | 0 | 0 | $2^{29}$ | 11.18s |

UNIVERSAL SERIAL BUS DEVICE HAVING LOGICAL CIRCUIT FOR CONVERSIVE AND IMMEDIATE HOST RESET OPERATION

CROSS-REFERENCE TO RELATED APPLICATION

This application is a continuation application of U.S. Ser. No. 10/269,264, filed Oct. 11, 2002 now U.S. Pat. No. 7,162,555, which relies for priority upon Korean Patent Application No. 01-63052 filed on Oct. 12, 2001, the contents of which are herein incorporated by reference in their entirety.

BACKGROUND OF THE INVENTION

1. Field of the Invention

The present invention relates to Universal Serial Bus USB device, and more particularly to a USB device having a logical circuit for reset, that is, connection/disconnection to/from a USB host.

2. Description of the Related Art

FIG. 1 is a block diagram showing the relation between a Universal Serial Bus (USB) device and a USB host. Referring to FIG. 1, a system 10 equipped with a USB device 114 and a personal computer (PC) 20 equipped with a USB host 210 are connected via a USB cable 220. The USB device 114 is connected to the USB host 210 included in the PC 20 through a transceiver 116 and the USB cable 220.

In the configuration of FIG. 1, if a reset of the system 10 is initiated, an Application Specific Integrated Circuit (ASIC) chip 110 and a Central Processing Unit (CPU) 112 perform the reset operation. However, the PC 20 cannot recognize the reset of the system 10 connected via the USB cable 210. As a result, even though the reset of the system 10 is initiated in order to change the configuration of the USB device 114, the USB host 210 and the PC 20 cannot recognize the reset, and continuously maintain the unchanged configuration information of the USB device 114.

The PC 20 does not request configuration information of the USB device 114 until a user disconnects the USB cable 220 from the PC 20 and the system 10 and connects the cable again. Whenever the system 10 needs to be reset in order to change the configuration information of the USB device 114, the user must disconnect and reconnect the USB cable 220.

In addition, the reset is necessary when the USB device 114 malfunctions or an error happens in the system 10. In that case, the user must also disconnect and reconnect the USB cable 220. That is, the USB cable 220 is pulled out from a plug 120 and then inserted into the same plug 220. When the USB cable 220 is inserted into the plug 120 again, the PC 20 performs a hot plug & play, recognizes the USB device 114 and receives the configuration information from the USB device 114. Here, the term "hot plug & play" means that the PC 20 recognizes the USB device 114 immediately after the cable is plugged in.

As described above, in order to reset the existing USB device 114, the user, in an inconvenient manner, has to unplug and plug the USB cable. As one solution to the problem, existing conventional art emulates a plug-out and plug-in of the USB cable, allowing the user to reset the USB device by pressing a switch in the USB system or in the USB device. However, the conventional art does not offer the best solution in the true sense in that it requires user's intervention.

Therefore, the existing USB reset methods, in addition to creating inconvenience to the user, do not allow for easy control of the reset operation time.

SUMMARY OF THE INVENTION

To solve the above-described problems, it is an object of the present invention to provide a Universal Serial Bus (USB) device having a logical circuit for allowing a USB host to reset the USB device without physically unplugging the USB cable or interrupting the USB system or USB device. When a personal computer (PC) user gives a command to the USB device, the USB host recognizes the connection/disconnection of the USB cable and resets the USB device or is programmed to automatically perform the connection/disconnection of the USB cable or reset in case an error occurs.

To achieve the above objective, one embodiment of the present invention is related to a Universal Serial Bus (USB) device which exchanges data with a USB host connected via a USB cable. According to one embodiment of the present invention, the USB device includes; a USB encoder for outputting encoding data; a reset controller for generating a reset control signal that is activated in a predefined logic level when the USB device is to be reset; and a data output unit for selecting and outputting one of the USB encoding data and a logic low signal, in response to the reset control signal.

Preferably, the USB device further includes a logic low signal generator for generating the logic low signal and outputting it to the data output unit. In addition, it is preferable that the reset controller include a timer register for adjusting the activation time of the reset control signal; and a timer for generating the reset control signal of the logic level during the time corresponding to the value set up in the timer register.

Moreover, preferably, the USB device further includes a register writing controller for preventing writing from being performed on internal registers, and a First In First Out (FIFO) block performing while the reset control signal is on.

To achieve the above objective, another embodiment of the present invention is related to a USB device which exchanges data with a USB host connected via a USB cable. According to another embodiment of the present invention, the USB device includes; a USB encoder for generating a differential USB encoding data and transmitting it to the USB host; and a reset control circuit for generating a logic low signal, transmitting it to the USB host during the pre-defined reset period instead of the differential USB encoding data and enabling the USB host to perform a plug & play when the USB device needs to be reset.

The reset control circuit is implemented as a logical circuit. It is preferable that the reset control circuit includes a timer register for controlling the reset period and the reset start and a timer for generating the logic low signal by operating according to the value set up in the timer register.

Moreover, preferably, the reset control circuit includes a register writing controller for preventing writing from being performed on internal registers and an FIFO block included in the USB device during the reset period. In addition, preferably, the reset control circuit receives a command to reset the USB device from the CPU of the system equipped with the USB device.

BRIEF DESCRIPTION OF THE DRAWINGS

The foregoing and other objects, features and advantages of the invention will be apparent from the more particular description of a preferred embodiment of the invention, as illustrated in the accompanying drawings in which like reference characters refer to the same parts throughout the different views. The drawings are not necessarily to scale, emphasis instead being placed upon illustrating the principles of the invention.

FIG. 6 is a table showing setup examples of a timer register shown in FIG. 4.

DETAILED DESCRIPTION OF PREFERRED EMBODIMENTS OF THE INVENTION

Figure 1:
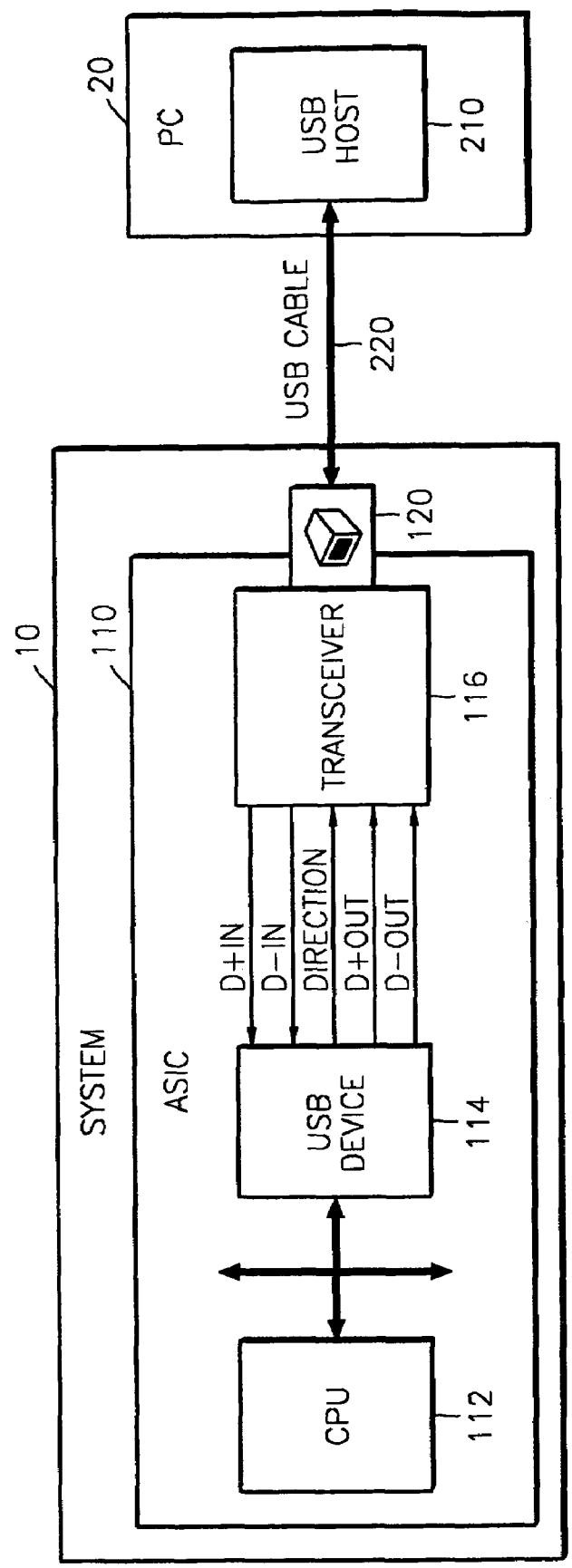
FIG. 1 is a block diagram showing the relation between a Universal Serial Bus (USB) device and a USB host.

The present invention will now be described in detail by describing preferred embodiments thereof with reference to the accompanying drawings. In the drawings, the same reference numerals denote the same elements.

FIG. 1 is a block diagram showing the relation between a USB device 114 and a USB host 210.

The USB cable includes four lines, that is, VDD, VSS, D+ and D−. VDD and VSS act as feeder lines used to provide power from the USB host 210 to the USB device 114. D+ and D−, which are data lines, are used to transmit differential USB data from the USB host 210 to the USB device 114 or vice versa.

The present invention provides the capability to reset the USB device without physically unplugging the USB cable. That is, with the USB cable connected the USB host can act as if the cable was disconnected.

The USB specification 1.1 states that if D+ and D− are in a logic low status for more than 2 μs~2.5 μs in case of a full-speed USB device, the USB cable is recognized as being disconnected. In addition, when the USB host gives a reset command to the USB device, D+ and D− should maintain a logic low status for more than 10 ms.

Therefore, with the USB cable connected, if D+ and D− maintain a logic low status for more than 2.5 μs, and D+ and D− are in a logic high status and a logic low status, respectively, the USB host in the PC recognizes that the full-speed USB device was disconnected and connected again, and performs the plug & play operation.

Figure 2:
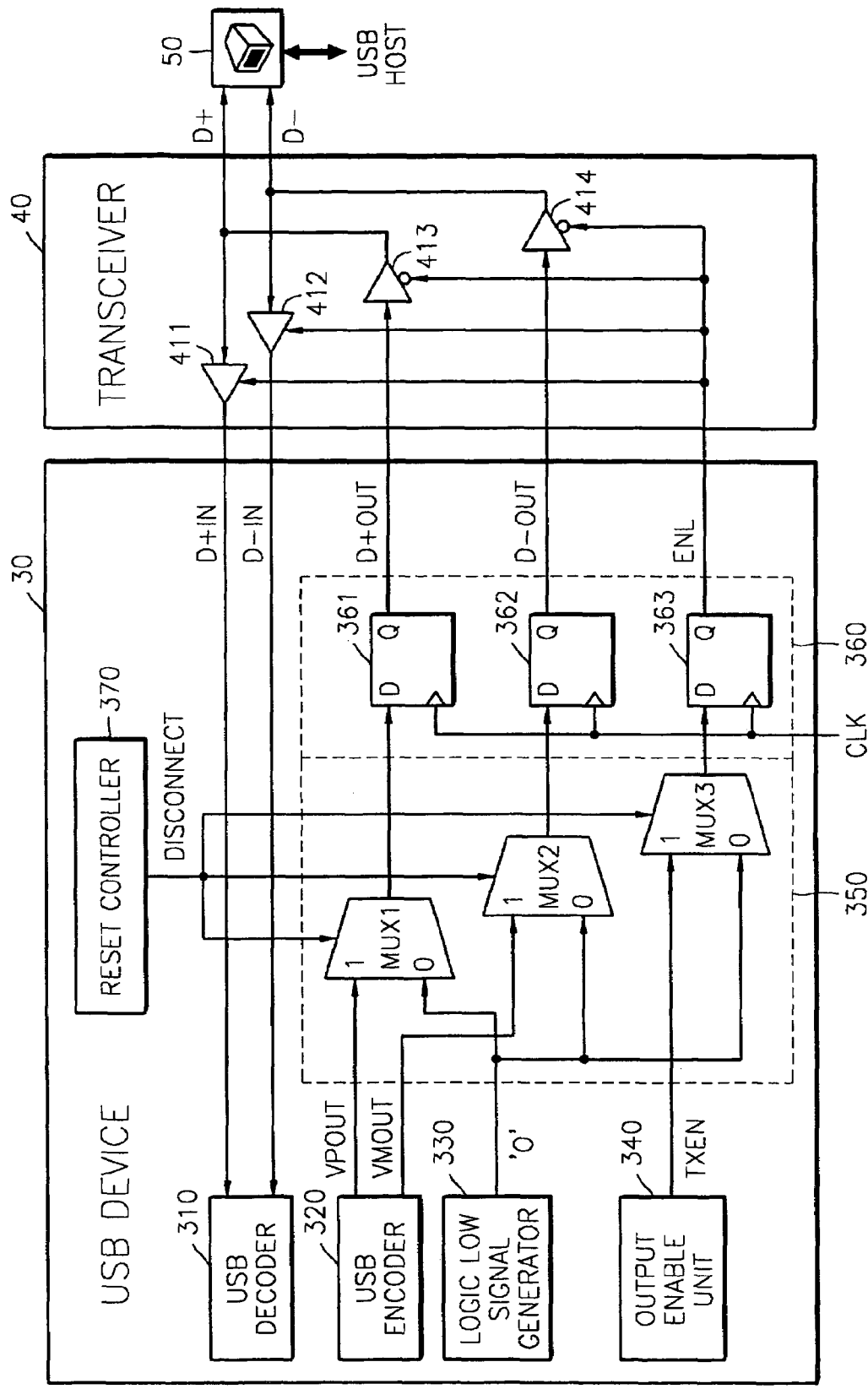
FIG. 2 is a block diagram showing the USB device according to one embodiment of the present invention.

FIG. 2 is a block diagram showing the USB device according to one embodiment of the present invention. FIG. 2 shows a transceiver 40 and a plug 50 in addition to the USB device 30.

Referring to FIG. 2, the USB device 30 includes a USB decoder 310, a USB encoder 320, a logic low signal generator 330, an output enable unit 340, a data selector 350, an output flip-flop unit 360 and a reset controller 370.

The USB decoder 310 receives and decodes the data (D+IN, D−IN) input to the USB device 30 through the transceiver 40 from the USB host. The USB encoder 320 encodes the data to be transmitted to the USB host and outputs it to the data output units 350 and 360.

The reset controller 370 outputs a reset control signal DISCONNECT having a low level when the USB device 30 needs to be reset. The data output units 350 and 360 select one of the USB encoding data VPOUT or VMOUT and a logic low signal ('0') depending on the reset control signal DISCONNECT and output the selected one to the transceiver 40. That is, when the reset control signal DISCONNECT is deactivated in a high level, the data output units select and output the USB encoding data VPOUT or VMOUT. If the reset control signal DISCONNECT is activated in a low level, the data output units select and output the logic low signal ('0'). The USB encoding data VPOUT and VMOUT is differential data to be transmitted to the data lines of the USB cable, that is, D+ and D−.

It is preferable that the reset controller 370 operate under the control of the CPU of the system equipped with the USB device 30. The data output units 350 and 360 include a data selector 350 and an output flip-flop unit 360. The data selector 350 includes three multiplexers, that is, the first multiplexer MUX1 through the third multiplexer MUX3. Also, the output flip-flop unit 360 includes the first flip-flop 361 through the third flip-flop 363.

In response to the reset control signal DISCONNECT, the first multiplexer MUX1 and the second multiplexer MUX2 select one of the USB encoding data VPOUT or VMOUT and the logic low signal ('0') and transmit the selected one to the first flip-flop 361 and the second flip-flop 362. In response to the reset control signal DISCONNECT, the third multiplexer MUX3 selects one of the first output enable signal TXEN and the logic low signal ('0'), and transmits the selected one to the third flip-flop 363. The first output enable signal TXEN, generated from the output enable unit 340, is an active low signal activated in a low level when the USB encoding data VPOUT or VMOUT is transmitted from the USB device 30 to the USB host.

The first flip-flop 361 through the third flip-flop 363 transmit the received data to the transceiver 40 after synchronizing the data with the clock signal CLK. According to the USB specification, since the full-speed USB device uses 12 Mbps, 12 MHz clock should be used as a clock input to the first flip-flop 361 through the third flip-flop 363.

The transceiver 40 transmits the D+/D− data received from the USB host to the USB device 30. In addition, the transceiver 40 receives the D+OUT/D−OUT data from the USB device 30, generates D+/D− data and transmits the data to the USB host. The transceiver 40 determines whether it will receive the data from the USB host or transmits the data from the USB host by controlling the buffers 411~414 of the transceiver depending on the second output enable signal ENL.

Like the first output enable signal TXEN, the second output enable signal ENL is an active low signal. That is, if the second output enable signal ENL is in a logic low, D+OUT and D−OUT output from the USB device 30 through the output buffers 413 and 414 are converted into D+ and D−, respectively. Then, D+ and D− are transmitted to the USB host. If the second output enable signal is in a logic high, data is transmitted to the USB device 30 from the USB host through the input buffers 411 and 412.

With reference to FIG. 2, the operation of the USB device 30 according to one embodiment of the present invention is described.

In case of normal operation other than the reset operation, the reset controller 370 outputs the reset control signal DISCONNECT having the logic high value ('1'). Since the reset control signal DISCONNECT is '1', the first multiplexer MUX1 through the third multiplexer MUX3 receive the data incoming to the input terminal '1' and output it. Then, the USB encoding data VPOUT and VMOUT, and the first output enable signal TXEN are transmitted to the transceiver 40 through the first flip-flop 361 through the third flip-flop 363. In this case, if the first output enable signal TXEN is in a logic low, the output buffers 413 and 414 operate and the VPOUT and the VMOUT are transmitted to the USB host through the USB cable.

In a reset operation, the reset controller 370 outputs the reset control signal DISCONNECT having the value '0'. Since the reset control signal DISCONNECT is '0', the first multiplexer MUX1 through the third multiplexer MUX3 receive the data incoming to the input terminal '0' and output it. The data incoming to the input terminal '0' of the first multiplexer MUX1 through the third multiplexer MUX3 is a logic low signal ('0') generated by the logic low signal generator 330. Then, the signal '0' is transmitted to the transceiver 40 via the first flip-flop 361 through the third flip-flop 363 instead of the USB encoding data VPOUT and VMOUT and the first output enable signal TEXN.

Since the second output enable signal ENL is '0', the buffers 411~414 of the transceiver 40 are controlled in such a way that the data is output to the USB host. In this case, '0' signals incoming instead of the USB encoding data VPOUT and VMOUT are transmitted to D+ and D−. Therefore, the USB cable is in a Single Ended Zero (SE0) status where both D+ and D− are '0'. If the status is maintained for more than 2.5 μs, the USB host recognizes that the USB cable is disconnected.

Figure 3:
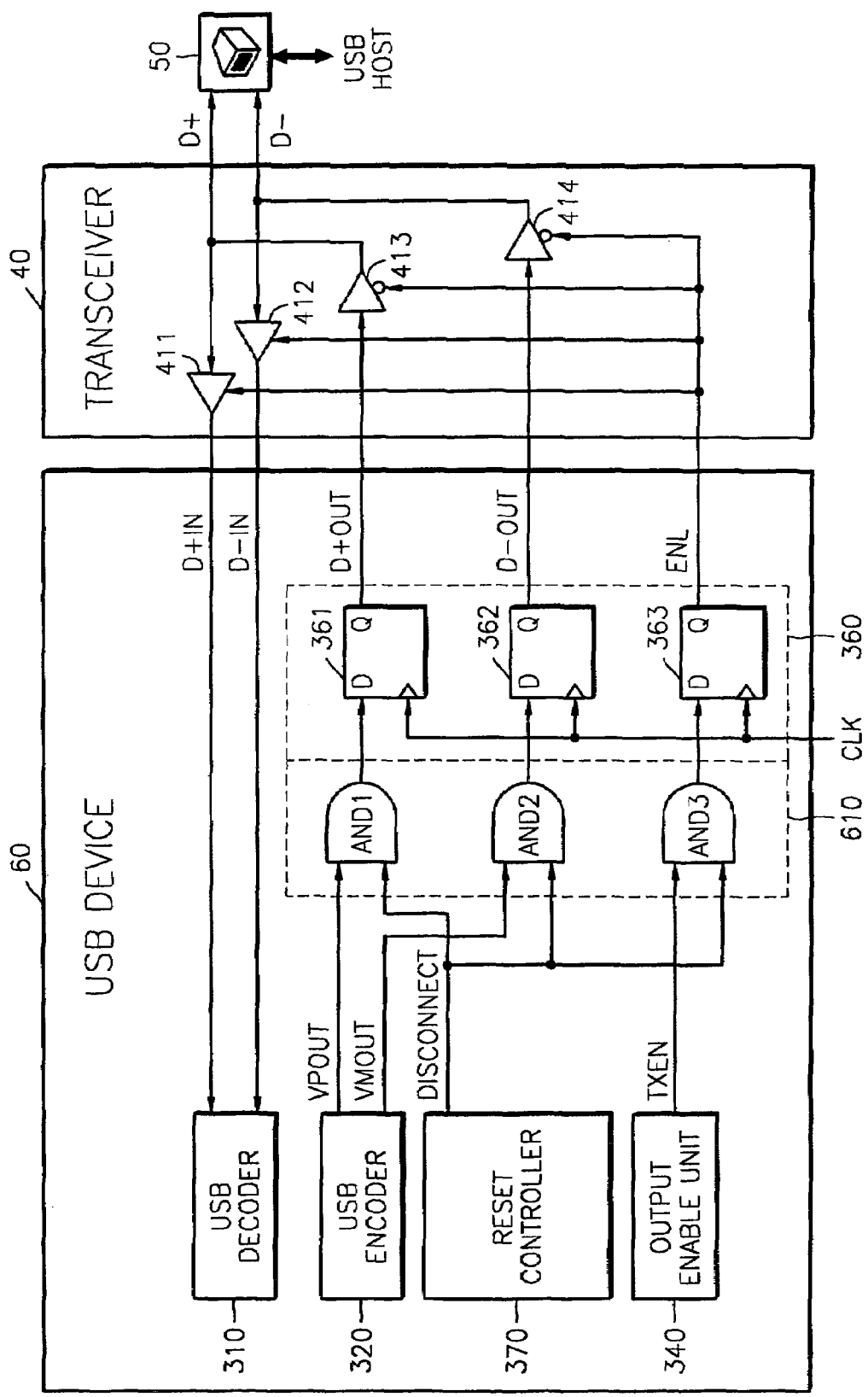
FIG. 3 is a block diagram showing the USB device according to another embodiment of the present invention.

FIG. 3 is a block diagram showing the USB device according to another embodiment of the present invention. Referring to FIG. 3, the USB device 60 according to another embodiment of the present invention includes a USB decoder 310, a USB encoder 320, an output enable unit 340, a data selector 610, an output flip-flop unit 360 and a reset controller 370.

The USB device 60 shown in FIG. 3 is different from the USB device 30 shown in FIG. 2 in that the configuration of the data selector 610 is different from that of the selector 350 shown in FIG. 2 and the reset controller 370 performs the role of the logic low signal generator 330 besides its own functions.

The data selector 350 shown in FIG. 2 is made up of three multiplexers while the data selector 610 shown in FIG. 3 is made up of three AND gates. The data selector 610 includes the first AND gate AND1 through the third AND gate AND3. The reset control signal DISCONNECT output from the reset controller 370 is input to each of the first input terminals of the first AND gate AND1 through the third AND gate AND3. The USB encoding data VPOUT and VMOUT and the first output enable signal TXEN are input to the remaining input terminals of the first AND gate AND1 through the third AND gate AND3.

The reset controller 370 activates the reset control signal DISCONNECT having the low level when the USB device 30 needs to be reset. Then, the output signals from the first AND gate AND1 through the third AND gate AND3 of the data selector 610 are in a low level. Therefore, the low level signals are transmitted to the transceiver 40 via the first flip-flop 361 through the third flip-flop 363 instead of the USB encoding data VPOUT and VMOUT and the first output enable signal TXEN.

It is preferable that the reset controller 370 operate under the control of CPU of the system equipped with the USB device 60. Since the other blocks shown in FIG. 3 are the same as the blocks shown in FIG. 2 in terms of function and configuration, the detailed description of them will be omitted to avoid repetition.

With regard to FIG. 3, the operation of the USB device 60 according to another embodiment of the present invention will be described.

In case of normal operation other than the reset operation, the reset controller 370 outputs the reset control signal DISCONNECT having the logic high value ('1'). Since the reset control signal DISCONNECT is '1', the first AND gate AND1 through the third AND gate AND3 output the USB encoding data VPOUT and VMOUT and the first output enable signal TXEN. Then, the differential USB encoding data VPOUT and VMOUT and the first output enable signal TXEN are input to the transceiver 40 via the first flip-flop 361 through the third flip-flop 363. In this case, if the first output enable signal TXEN is a logic low, the output buffers 413 and 414 operate and the VPOUT and VMOUT are transmitted to the USB host through the USB cable.

In case of the reset operation, the reset controller 370 outputs the reset control signal DISCONNECT having the value '0'. Since the reset control signal DISCONNECT is '0', the output signals from the first AND gate AND1 through the third AND gate AND3 are 0. Then, the signal '0' is transmitted to the transceiver 40 via the first flip-flop 361 through the third flip-flop 363 instead of the USB encoding data VPOUT and VMOUT and the first output enable signal TXEN.

Since the second output enable signal ENL is '0', the buffers 411~414 of the transceiver 40 are controlled in such a way that the data is output to the USB host. The '0' signals are transmitted to D+ and D−. Therefore, the USB cable is in a Single Ended Zero (SE0) status where both D+ and D− are '0'. If the status is maintained for more than 2.5 μs, the USB host recognizes that the USB cable is disconnected.

Figure 4:
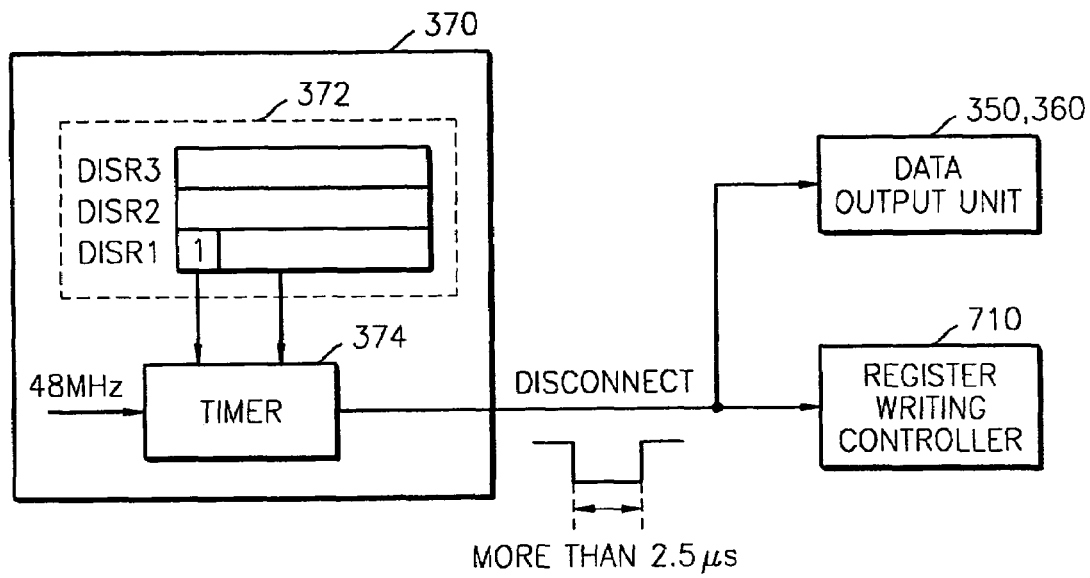
FIG. 4 is a block diagram showing a reset controller shown in FIGS. 2 and 3.

FIG. 4 is a block diagram showing the reset controller 370 shown in FIGS. 2 and 3. As shown in FIG. 4, the reset controller 370 includes a timer register 372 and a timer 374. The timer 374 is controlled by the set value of the timer register 372 and adjusts the SE0 duration time during which the reset control signal DISCONNECT having the logic low ('0') is generated. The SE0 duration time is the reset operation period. In case of the full-speed USB device, the SE0 duration time is more than 2.5 μs and the timer 374 is used to maintain the duration time. The timer register 372, one of the internal registers, is used to set up the SE0 period of the timer 374.

According to one embodiment of the present invention, the timer register 372 includes three 8-bit registers DISR1, DISR2 and DISR3 which can set up various periods. However, it is obvious to one of ordinary skill in the art that the number of the registers and the bits can vary.

If '1' is written on the most significant bit MSB of the register DISR1, the timer 374 starts to operate. That is, the bit [7] of the register DISR1 adjusts the operation start of the timer 374. In addition, the bits [6:0], [7:0] and [7:0] of the registers DISR1, DISR2 and DISR3 adjust the SE0 period.

Preferably, when the timer 374 starts operating and makes the reset control signal DISCONNECT a logic low signal ('0'), nothing can be written on the timer register 372 during the reset operation period. In addition, it is preferable that writing is prevented from being performed on other internal registers and on the end point First In First Out (FIFO) block (not shown). For writing prevention, the USB devices 30 and 60 of the present invention further include the register writing controller 710. The end point FIFO block is a memory block that stores the data to be transmitted to the USB host or the data received from the USB host temporarily.

Figure 5:
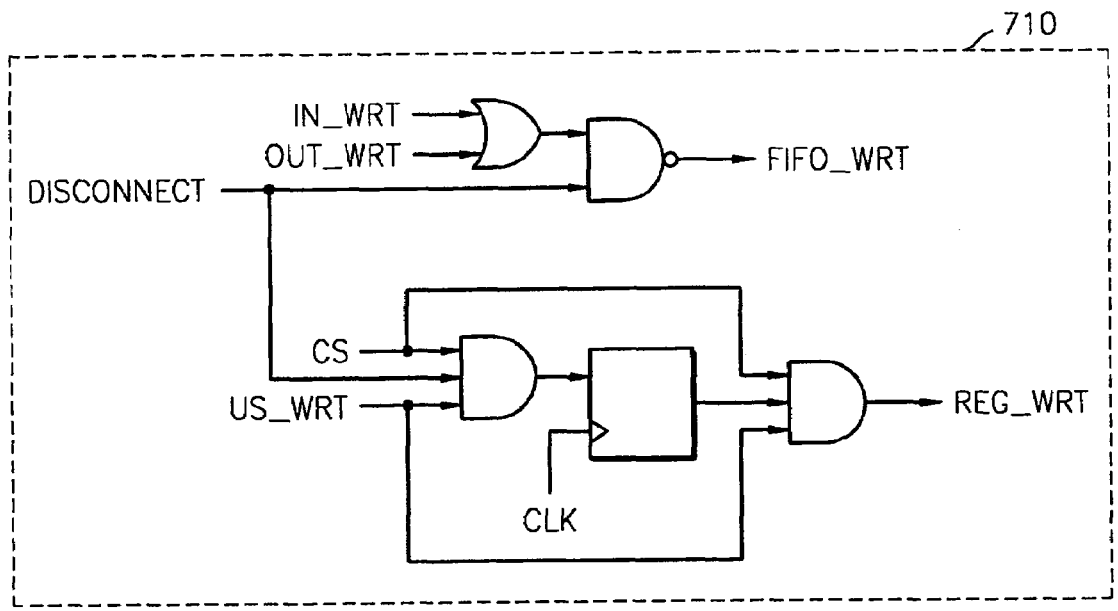
FIG. 5 shows a register writing controller shown in FIG. 4.

FIG. 5 shows the register writing controller 710 shown in FIG. 4. In response to the reset control signal DISCONNECT, the register writing controller 710 generates the register writing control signal REG_WRT and the FIFO writing control signal FIFO_WRT. The register writing control signal REG_WRT is generated as a result of gating of the reset control signal DISCONNECT, the register writing signal US_WRT and the chip selection signal CS. The chip selection signal CS is activated as '1', when the CPU of the system equipped with the USB devices 30 and 40 selects the USB devices 30 and 40. The register writing signal US_WRT is activated as '1', when the CPU writes the data on the internal register of the USB devices 30 and 40. In order to generate the register writing control signal REG_WRT, the register writing controller 710 uses two logic multiply gates and one flip-flop. When the reset control signal DISCONNECT is '0', the register writing control signal REG_WRT is always '0'. In addition, if the register writing control signal REG_WRT is '0', writing is prevented from being performed on the internal register of the USB devices 30 and 40. Therefore, the register writing control signal REG_WRT prevents writing on the internal register when the reset control signal DISCONNECT is '0'. In addition, since nothing is written on the timer register 372, the USB devices 30 and 60 of the present invention can maintain the SE0 in a stable manner.

The FIFO writing control signal FIFO_WRT is generated as a result of gating of the reset control signal DISCONNECT, the input writing signal IN_WRT and the output writing signal OUT_WRT. In order to generate the register writing control signal REG_WRT, the register writing controller 710 uses one logical sum gate and one NAND gate.

The logical sum gate logic-adds the input writing signal IN_WRT and the output writing signal OUT_WRT. The output writing signal OUT_WRT is activated as '1' when data is written on the FIFO block to transmit the data to the USB host. The input writing signal IN_WRT is activated as '1' when data received from the USB host is written on the FIFO block. The NAND gate NANDs the output signal of the logic sum gate with the reset control signal DISCONNECT. When the reset control signal DISCONNECT is activated as '0', the FIFO writing control signal FIFO_WRT is '1'. If the FIFO writing control signal FIFO_WRT is '1', nothing can be written on the FIFO block. Therefore, during the reset operation, nothing can be written on each of the end point FIFO block of the USB devices 30 and 60.

FIG. 6 shows the set examples of the timer register shown in FIG. 4. As described above, the timer register 372 includes three 8-bit registers DISR1, DISR2 and DISR3. Exclusive of the bit [7] of the register DISR1, the bits [6:0], [7:0] and [7:0] of DISR1, DISR2 and DISR3 are indicated as WDT_CNT [22:0].

A value corresponding to the desired SE0 period is written on the WDT_CNT [22:0]. The timer 374 uses a 48 MHz clock. Therefore, one cycle of the clock is 20.833 ns. Based on the data, FIG. 6 shows the set examples of WDT_CNT[22:0] to set up an appropriate SE0 period on the timer value. For ease of description, the variable timeout value TOV is used. If the bit [0] of the WDT_CNT[22:0] is set to '1', the timeout value TOV is 0. If the bit [1] of the WDT_CNT[22:0] is set to '1', the timeout value TOV is 1. In the same way, if the bit [22] of the WDT_CNT[22:0] is set to '1', the time out value TOV is 22. The timer 374 generates as many reset control signals of the logic low ('0') as N cycles of the clock (48 MHz). The following formula shows the relation between N and the timeout value TOV.

$$N = 2^{TOV} + 7 \quad \text{[Formula 1]}$$

Therefore, when the timer 374 operates, SE0 status is maintained for N*20.833 ns. Referring to the table of FIG. 6, if N is $2^{07}$, the SE0 is 2.67 μs while if N is $2^{08}$, the SE0 is 5.33 μs. If N is $2^{29}$, the SE0 is 11.18 s.

As described above, bit [7] of register DISR1 is a bit to adjust the operation time of the timer 374. If '1' is written, the reset operation starts. In addition, until the reset operation is completed, no value can be written on the internal register of the USB device. If the reset operation ends, the bit [7] of the same register becomes 0 and any value can be written on the internal register of the USB device. It is preferable that the end of the reset operation is notified through interruption to the CPU.

Although specific embodiments of the invention have been described herein for illustrative purposes, various modifications and equivalents thereof can be made without departing from the spirit and scope of the invention, as will be recognized by those skilled in the relevant art. Accordingly, the invention is not limited to the disclosure, but instead its scope is to be determined entirely by the following claims.

The USB device of the present invention has a logical circuit that enables the USB host to recognize as if the USB cable is unplugged with the USB cable connected and perform the hot plug & play. The logic circuit eliminates the need for additional hardware configuration since the CPU commands are sufficient to execute the reset operation.

According to the USB device of the present invention, the user need to press a switch or physically disconnects the USB cable. The only thing he/she has to do is to manually select the reset of the USB device from the programs of the PC including the USB host. In addition, the automatic program saved in the system equipped with the USB device helps to implement the reset operation of the USB device automatically when a pre-defined situation happens.

What is claimed is:

1. A Universal Serial Bus (USB) device for exchanging data with a USB host connected via a USB cable, the USB device comprising:
   a USB encoder for outputting USB encoding data;
   a data output unit outputting one of the USB encoding data and a logic low signal in response to a reset control signal that is activated in a predetermined logic level; and
   a reset controller controlling a start time at which the reset control signal is activated and varying a duration time during which the reset control signal is activated on the basis of reset information that is written to the reset controller, wherein the reset controller receives the reset information from a microcontroller of a system equipped with the USB device, wherein the data output unit outputs the logic low signal in response to the activation of the reset control signal when a configuration of the USB device is changed during a normal operation irrespective of a power-on operation or a watchdog operation, and wherein the USB host performs a reset operation for detecting the change in the configuration of the USB device when the logic low signal is transmitted to the USB host during a time corresponding to the duration time.

2. The USB device of claim 1, wherein the data output unit outputs the USB encoding data when the USB device is in a normal operation, and outputs the logic low signal when the USB device is to be reset.

3. The USB device of claim 2, wherein the data output unit outputs the logic low signal when the USB device malfunctions or an error occurs in a system equipped with the USB device.

4. The USB device of claim 1, wherein the reset information comprises a plurality of bits, and wherein at least one bit of the plurality of bits of the reset information is used to control the start time and other bits of the plurality of bits of the reset information are used to control the duration time.

5. The USB device of claim 4, wherein the at least one bit used to control the start time of a reset operation is in a first logic state, and at an end of the reset operation, the at least one bit is in a second logic state.

6. The USB device of claim 1, further comprising a logic low signal generator for generating the logic low signal and outputting it to the data output unit.

7. The USB device of claim 1, wherein the reset controller comprises:
   a timer register where the reset information for controlling the start time and the duration time is registered; and a timer for generating the reset control signal corresponding to the reset information registered in the timer register.

8. The USB device of claim 7, wherein the timer register includes at least three 8-bit registers from which at least one bit is used to control the start time and other bits are used to control the duration time.

9. The USB device of claim 7, wherein the timer further maintains a reset operation period based on the reset information registered in the timer register.

10. The USB device of claim 1, wherein the data output unit comprises:
    a data selector receiving a first output enable signal, the USB encoding data and the logic low signal, and outputting a second output enable signal and one of the USB encoding data and the logic low signal in response to the reset control signal; and
    an output flip-flop unit for transmitting the output from the data selector to the transceiver after synchronizing the data with a pre-determined clock signal.

11. The USB device of claim 10, wherein the data selector comprises:
    a first multiplexer for selecting and outputting one of a first data signal of the USB encoding data and the logic low signal in response to the reset control signal;
    a second multiplexer for selecting and outputting one of a second data signal of the USB encoding data and the logic low signal in response to the reset control signal; and
    a third multiplexer for selecting and outputting one of the first output enable signal and the logic low signal as the second output enable signal in response to the reset control signal.

12. The USB device of claim 10, wherein, in case the reset control signal is activated in a low level, the data selector comprises:
    a first AND gate for logic-multiplying a first data signal of the USB encoding data and the reset control signal;
    a second AND gate for logic-multiplying a second data signal of the USB encoding data and the reset control signal;
    and a third AND gate for logic-multiplying the first output enable signal and the reset control signal and outputting the second output enable signal.

13. The USB device of claim 10, wherein, when the reset control signal in a first logic state is applied to the data output unit, the data output unit outputs the first output enable signal as the second output enable signal, and when the reset control signal in the second logic state is applied to the data output unit, the data output unit outputs the logic low signal as the second output enable signal.

14. The USB device of claim 13, wherein the second output enable signal controls a data path between the USB host and the USB device.

15. The USB device of claim 1, further comprising a register writing controller for preventing writing from being performed on internal registers and a FIFO block included in the USB device while the reset control signal is activated.

16. A Universal Serial Bus (USB) device for exchanging data with a USB host connected via a USB cable, the USB device comprising:
    a USB encoder for outputting USB encoding data;
    a data output unit outputting one of the USB encoding data and a logic low signal in response to a reset control signal that is activated in a predetermined logic level; and
    a reset controller controlling a start time at which the reset control signal is activated and a duration time during which the reset control signal is activated on the basis of reset information registered thereto, wherein the reset controller comprises:
    a timer register where the reset information for controlling the start time and the duration time is registered, wherein the timer register includes at least three 8-bit registers from which at least one bit is used to control the start time and other bits are used to control the duration time; and
    a timer for generating the reset control signal corresponding to the reset information registered in the timer register.

* * * * *